United States Patent [19]
Kondo et al.

[11] Patent Number: 5,824,739
[45] Date of Patent: Oct. 20, 1998

[54] SILICONE FOAM CONTROL COMPOSITIONS

[75] Inventors: Hidetoshi Kondo; Masahiro Takahashi, both of Chiba Prefecture, Japan

[73] Assignee: Dow Corning Toray Silicone Co., Ltd., Tokyo, Japan

[21] Appl. No.: 736,844

[22] Filed: Oct. 28, 1996

Related U.S. Application Data

[62] Division of Ser. No. 451,110, May 25, 1995, Pat. No. 5,612,410.

[30] Foreign Application Priority Data

May 30, 1994 [JP] Japan ................................ 6-139488

[51] Int. Cl.$^6$ .................................................. C08K 3/22
[52] U.S. Cl. ......................... 524/860; 252/358; 252/321; 524/863; 528/41
[58] Field of Search .................................. 252/358, 321; 524/863, 860; 528/41

[56] References Cited

U.S. PATENT DOCUMENTS

| | | | |
|---|---|---|---|
| 3,355,424 | 11/1967 | Brown | 260/46.5 |
| 3,890,269 | 6/1975 | Martin | 260/46.5 E |
| 4,514,319 | 4/1985 | Kulkarni et al. | 252/321 |
| 4,584,125 | 4/1986 | Griswold et al. | 252/358 |
| 4,637,890 | 1/1987 | Crabtree et al. | 252/90 |
| 4,983,316 | 1/1991 | Starch | 252/174.15 |
| 5,045,225 | 9/1991 | Aronson et al. | 252/174.15 |
| 5,556,902 | 9/1996 | Shouji et al. | 524/114 |

FOREIGN PATENT DOCUMENTS

| | | | |
|---|---|---|---|
| 0427263 | 8/1990 | European Pat. Off. | B01D 19/04 |
| 0579999 | 7/1993 | European Pat. Off. | B01D 19/04 |
| 3269098 | 6/1991 | Japan . | |

*Primary Examiner*—Margaret W. Glass
*Attorney, Agent, or Firm*—Timothy J. Troy

[57] ABSTRACT

The present invention relates to a silicone foam control composition that is able to inhibit foaming only during the rinse stage without impairing a strong foaming action during the wash stage. The silicone foam control composition comprises 80 to 99 weight % of an organopolysiloxane containing amino-functional or carboxyl-functional organic groups and silica with a specific surface area of at least 50 $m^2/g$.

25 Claims, No Drawings

SILICONE FOAM CONTROL COMPOSITIONS

This application is a division of application Ser. No. 08/451,110 filed May 25, 1995 which application is now: U.S. Pat. No. 5,612,410 of which the following is a specification.

BACKGROUND OF THE INVENTION

This invention relates to foam control compositions for use in detergents. More particularly, this invention relates to foam control compositions which can inhibit foaming during post-wash rinsing operations, but which are able to do so without impairing the cleaning performance and still retain an appropriate level of foaming during the washing stage.

Soiled clothing is cleaned by introducing the clothing, a detergent composition, and water into a washing machine. The soil becomes dispersed in the water through the action of mechanical force and by affinity with the surfactant. The resulting waterborne soil dispersion is then discharged, and residual soil is subsequently rinsed out with fresh water. However, due to the strong foaming character of the surfactant (the cleaning component of the detergent composition), foaming can be quite persistent even during the rinse operation. This results in a number of shortcomings, such as requiring a larger number of rinses, lengthening the time required for the rinse operation, requiring large amounts of water, increasing the amount of waste water, and increasing power consumption.

In response to this, various foam control compositions for use in detergent applications have been disclosed with the goal of achieving an excellent cleaning performance while inhibiting foaming during the post-wash rinsing operation. For example, Japanese Patent Application Laid Open No. 2-230900 (230,900/1987), discloses a composition having a fatty acid soap as the base component. Japanese Patent Application Laid Open No. 3-269098 (269,098/1991), discloses a composition whose base components are polydimethylsiloxane and hydrophobic silica.

However the above compositions have several deficiencies. For example, large amounts of fatty acid soap must be present in order for the necessary foam-inhibiting performance to be developed. This not only conflicts with the goal of reducing the detergent volume, but also imparts a yellow cast to clothing while the undissolved residues stain the interior of the washing machine. Furthermore, in polydimethylsiloxane-based compositions, the foam-inhibiting activity is lost during the wash stage, which makes it very problematic to obtain good performance during rinsing. Although this system can give an acceptable performance during rinsing if the polydimethylsiloxane content is raised, this tactic causes excessive foam extinction during the washing stage, to the point that even the foam desirably exhibited by the detergent is almost completely extinguished.

SUMMARY OF THE INVENTION

The present invention relates to a foam control composition comprising about 80 to 99 weight % of an organopolysiloxane having amino-functional or carboxyl-functional organic groups and silica having a specific surface area of at least 50 m²/g.

It is an object of the present invention to introduce foam control compositions which permit strong foaming action during the washing stage while inhibiting foaming only during rinsing operations.

DETAILED DESCRIPTION OF THE INVENTION

The present invention relates to a foam control composition comprising (A) 80 to 99 weight % of an organopolysiloxane having the average formula:

$$R^1_a R^2_b Q_c SiO_{(4-a-b-c)/2}$$

wherein $R^1$ is selected from the group consisting of hydrogen, a hydroxyl group, and a monovalent hydrocarbon group having from 1 to 10 carbon atoms, $R^2$ denotes a monovalent hydrocarbon group having from 1 to 10 carbon atoms, Q denotes a group having the formula -$R^3Y$ wherein $R^3$ denotes a divalent hydrocarbon group having from 2 to 18 carbon atoms and Y is an amino-functional or carboxyl-functional monovalent organic group, a is zero or greater than zero, b and c are each positive numbers, with the proviso that the sum of a+b+c has a value of 1.9 to 2.2, and (B) 1 to 20 weight % of silica having a specific surface area of at least 50 m²/g.

The group $R^1$ in (A) denotes a hydrogen atom, a hydroxyl group, or a monovalent hydrocarbon group having from 1 to 10 carbon atoms. The monovalent hydrocarbon group having 1 to 10 carbon atoms include alkyl groups such as methyl, ethyl, propyl, butyl, pentyl, and hexyl, aryl groups such as phenyl, tolyl, and xylyl, aralkyl groups such as benzyl and phenethyl, haloalkyl groups such as 3-chloropropyl and 3,3,3-trifluoropropyl.

The group $R^2$ denotes a monovalent hydrocarbon group having from 1 to 10 carbon atoms and is specifically exemplified by methyl, ethyl, propyl, butyl, pentyl, hexyl, vinyl, and phenyl.

The group Q is a polar organic group having the formula -$R^3Y$, in which $R^3$ is a divalent hydrocarbon group having from 2 to 18 carbon atoms, for example, ethylene, propylene, butylene, isobutylene, pentamethylene, octamethylene, decamethylene, dodecamethylene, and cyclohexylene. The group Y in -$R^3Y$ is an amino-functional or carboxyl-functional monovalent organic group and is specifically exemplified by amino groups including amino, gamma-(2-aminoethyl)amino, methylamino, ethylamino, cyclohexylamino, and phenylamino, a carboxyl group, and alkylthiocarboxyl groups such as methylthiocarboxyl and ethylthiocarboxyl.

The group Y includes the above amino groups after neutralization with a carboxylic acid and the carboxyl and thiocarboxyl groups after neutralization with an alkali metal hydroxide or an ammonium compound.

Viewed from the goal of selectively preventing foaming during the rinsing stage without adversely affecting the foaming and cleaning performance during the washing action, component (A) preferably has an M/q ratio (wherein q is the number of moles of the polar organic group represented by Q in the average component formula $R^1_a R^2_b Q_c SiO_{(4-a-b-c)/2}$ and M is the overall molecular weight of the organopolysiloxane $R^1_a R^2_b Q_c SiO_{(4-a-b-c)/2}$) of 100 to 25,000 and preferably of 200 to 15,000. The polarity is too high when the M/q ratio is less than 100: this causes strong binding to the fabric and interior of the washing machine, which thereby soils the fabric and washing machine, and also prevents the development of an acceptable foam-inhibiting activity. An inadequate polarity is obtained when this ratio exceeds 25,000, which prevents the manifestation of the functional effects of the present invention, i.e., inhibition of foaming only during the rinsing stage without preventing a strong foaming action in the washing stage. Considerations such as processability and dispersibility in the wash bath make viscosities of 50 to 50,000 mm²/s (1 mm²/s=1 centistoke (cS)) preferred for component (A), while viscosities of 100 to 20,000 mm²/s are more preferred. Component (A) is specifically exemplified by the following compounds:

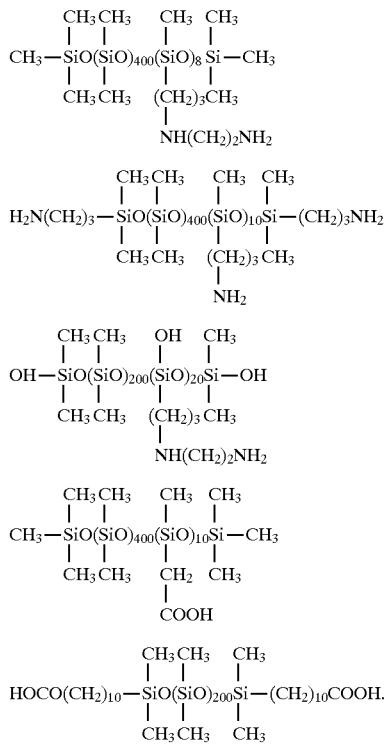

The foam control compositions of this invention must contain 80 to 99 weight percent of component (A) in order to exhibit excellent foam-inhibiting performance.

The silica comprising component (B) is added as a foam-inhibiting component, and its specific surface area must be at least 50 m²/g. Silica (B) having a specific surface area less than 50 m²/g is poorly dispersible in component (A) and also has a poor foam-inhibiting performance. The silica of component (B) is specifically exemplified by fumed silica and calcined silica prepared by dry processes, precipitated silica prepared by wet processes, silica aerogel, quartz, and fused silica. The surface of silica (B) may be treated with silanes or organosiloxane oligomers, either prior to or during its addition to component (A). Silanes that can be used to treat the surface of the silica are specifically exemplified by organoalkoxysilanes such as methyltrimethoxysilane, vinyltrimethoxysilane, and trifluoropropyltrimethoxysilane, organosilazanes such as hexamethyldisilazane, and organohalosilanes such as trimethylchlorosilane and dimethylvinylchlorosilane. The organosiloxane oligomers are specifically exemplified by silanol-endblocked dimethylsiloxane oligomers, silanol-endblocked dimethylsiloxane-methylvinylsiloxane co-oligomers, dimethylhydrogensiloxy-endblocked dimethylsiloxane oligomers, trimethylsiloxy-endblocked methylhydrogensiloxane oligomers, and trimethylsiloxy-endblocked methylhydrogensiloxane-dimethylsiloxane co-oligomers.

The foam control composition must contain 1 to 20 weight percent of component (B) in order to exhibit an excellent foam-inhibiting performance.

The foam control compositions can be prepared simply by mixing components (A) and (B) to homogeneity. In addition to components (A) and (B), the foam control compositions of this invention may contain optional components such as organopolysiloxanes including trimethylsiloxy-endblocked dimethylpolysiloxanes, dimethylvinylsiloxy-endblocked dimethylpolysiloxanes, trimethylsiloxy-endblocked methylhydrogenpolysiloxanes, trimethylsiloxy-endblocked methylhydrogensiloxane-dimethylsiloxane copolymers, dimethylhydroxysiloxy-endblocked dimethylpolysiloxanes, dimethylhydrogensiloxy-endblocked dimethylpolysiloxanes, and dimethylsiloxane-methyl (polyoxyalkylene)siloxane copolymers, silicone resins such as triorganosiloxysilicates, and inorganic powders such as aluminum hydroxide, calcium carbonate, and silica other than component (B). The triorganosiloxysilicates may be represented by the formula $[(CH_3)_3SiO_{1/2}]_x[SiO_2]_y$, in which the ratio of x/y ranges from 0.125 to 6. These silicates can be prepared by the cohydrolysis of tetraalkoxysilane and trimethylchlorosilane or by the cohydrolysis of water glass and trimethylchlorosilane in a toluene/water mixture.

The foam control compositions of this invention may be particulate foam control agents in finely divided form for inclusion in a detergent composition in powder form by coating or encapsulation with a carrier substance. This identity of this carrier substance is not critical provided it is soluble or dispersible in water and is solid at room temperature. The carrier substance is exemplified by, but not limited to, polyethylene glycol, polyethylene glycol-polypropylene glycol copolymers, the alkyl ethers of polyethylene glycol, higher alcohols, higher fatty acid esters, methylcellulose, hydroxymethylcellulose, hydroxycellulose, carboxyvinylcellulose, sucrose fatty acid esters, polyvinyl alcohol, starch, gelatin, and agar. The foam control compositions of this invention may be used after conversion into powder by coating or encapsulation with the carrier substance, wherein said powder may have a flake, spherical, or irregular, morphology.

The devices used to prepare the foam control compositions of this invention are not critical, but are preferably capable of simultaneous stirring, heating, and vacuum degassing. Devices for the preparation of the foam control compositions of this invention are exemplified by homomixers, colloid mills, planetary mixers, kneader mixers, twin-screw extrusion compounders, ball mills, and three-roll mills. An additional increase in the foam-inhibiting performance can be obtained by the execution of heat treatment within the range from 30° C. to 200° C. either during or after the mixing of components (A) and (B). In order to obtain an even hi her effect from this heat treatment, a catalyst, such as sulfuric acid or potassium hydroxide is preferably added in very small quantities during the heat treatment. At this point, mixing is preferably carried out under an inert gas blanket or reduced pressure as necessary.

In the working and comparative examples, "parts" indicates "weight parts", the viscosity is the value measured at 25° C., and viscosity is measured in mm²/s (1 mm²/s=1 centistoke (cS)). The foam-inhibiting activity during the wash and rinse stages was tested in the examples as follows:

Test of the foam-inhibiting activity during the wash and rinse stages

The following were placed in a 50L 2-tank washing machine (W392 from Matsushita Denki Kabushiki Kaisha): 30L of water (hardness=3), 1.2 kg fabric (sports shirts, undershirts, towels), and a commercial granular laundry detergent (Attack from Kao Kabushiki Kaisha) into which the foam control composition had been preliminarily dispersed at the rate of 1.2 weight % based on the quantity of detergent. The foam height was measured after 2 minutes of strong reversing agitation and quiescence for 30 seconds.

Agitation was then again conducted for 5 minutes, after which the foam height was measured by the same method as before. This was followed by operation for another 5 minutes and measurement of the foam height. The total of the three foam height values thus obtained was designated as the foam height during the wash stage. The wash water was then discharged over a period of 80 seconds and water (hardness= 3) was introduced up to the level of the overflow discharge outlet on the wash tank. After rinse agitation for 5 minutes and standing for 3 minutes, the foam status on the water surface was evaluated according to the 7-level scale given below, and the resulting value was designated as the foam-inhibiting activity in the first rinse. The rinse water was then discharged over a period of 130 seconds, followed by another rinse using the same procedure as before. The foam status on the water surface was again evaluated, and the resulting value was designated as the foam-inhibiting activity in the second rinse. The following scale was used to evaluate the foam status on the water surface after each rinse operation.

| score | foam status on the water surface (area of foam relative to the overall water surface) |
|---|---|
| 7 | foam was not observed on the water surface |
| 6 | a fine foam was observed in the form of several tens of 2 to 3 mm particles (area no larger than about 2%) |
| 5 | a fine foam was observed in the form of islands no larger than about 1 cm (area no larger than about 10%) |
| 4 | a fine foam was observed in the form of islands no larger than about several centimeters (area no larger than about 20%) |
| 3 | a layer of fine foam was observed in the form of islands several centimeters in size (area no larger than about 80%) |
| 2 | a layer of fine foam covered almost the entire surface (area larger than about 80%) |
| 1 | a layer of fine foam covered the entire surface, and foam bubbles were present with diameters greater than or equal to several millimeters |

EXAMPLE 1

A coarse mixture was prepared from the following: 93.5 parts of a dimethylsiloxane-methyl(gamma-(2-aminoethyl) aminopropyl)siloxane copolymer having a viscosity of about 1,200 mm²/s and having the average formula:

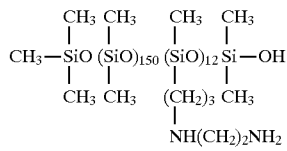

4.5 parts hexamethyldisilazane, 0.4 part ion-exchanged water, and 6.5 parts dry-process silica having a specific surface area of 300 m²/g (Aerosil 300 from Nippon Aerosil Kabushiki Kaisha). This was followed by processing in a homomixer to obtain a thorough dispersion. This dispersion was transferred into a condenser-equipped four-neck flask, where it was reacted at 80° C. for 6 hours. The low boilers were subsequently removed by heating to 180° C. and stripping for 1 hour at 30 mmHg. Cooling then yielded a silicone foam control composition with a viscosity of about 10,000 mm²/s. This silicone foam control composition was tested for its foam-inhibiting activity during washing and rinsing, and the results are reported in Table 1.

EXAMPLE 2

A coarse mixture was prepared from the following: 93.5 parts of trimethylsiloxy-endblocked dimethylsiloxane-methyl(gamma-(2-aminoethyl)aminopropyl)siloxane copolymer having a viscosity of about 1,300 mm²/s having the average formula:

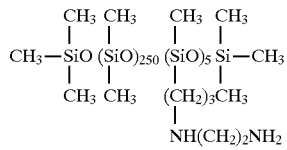

4.5 parts hexamethyldisilazane, 0.4 part ion-exchanged water, and 6.5 parts dry-process silica having a specific surface area of 300 m²/g (Aerosil 300 from Nippon Aerosil Kabushiki Kaisha). This was followed by processing in a homomixer to obtain a thorough dispersion. This dispersion was transferred into a condenser-equipped four-neck flask, where it was reacted at 80° C. for 6 hours. The low boilers were subsequently removed by heating to 180° C. and stripping for 1 hour at 30 mmHg. Cooling then yielded a silicone foam control composition with a viscosity of 6,600 mm²/s. This silicone foam control composition was tested for its foam-inhibiting activity during washing and rinsing, and the results are reported in Table 1.

EXAMPLE 3

A coarse mixture was prepared from the following: 96 parts of trimethylsiloxy-endblocked dimethylsiloxane-methyl(2-carboxyethyl)siloxane copolymer having a viscosity of about 2,300 mm²/s having the average formula

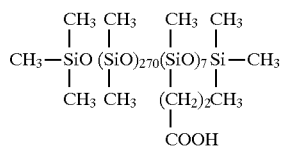

4 parts dry-process silica having a specific surface area of 300 m²/g (Aerosil 300 from Nippon Aerosil Kabushiki Kaisha), and 0.03 parts sulfuric acid. This was followed by processing in a homomixer to obtain a thorough dispersion. This dispersion was transferred into a condenser-equipped four-neck flask, where it was reacted at 150° C. for 2 hours Cooling then yielded a silicone foam control composition with a viscosity of about 25,000 mm²/s. This silicone foam control composition was tested for its foam-inhibiting activity during washing and rinsing, and the results are reported in Table 1.

EXAMPLE 4

A coarse mixture was prepared from the following: 96 parts of a dimethyl(10-carboxydecyl)-endblocked dimethylpolysiloxane having a viscosity of about 4,400 mm²/s having the average formula:

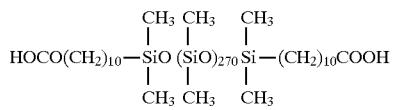

4 parts dry-process silica having a specific surface area of 300 m2/g (Aerosil 300 from Nippon Aerosil Kabushiki Kaisha), and 0.03 part sulfuric acid. This was followed by processing in a homomixer to obtain a thorough dispersion. This dispersion was transferred into a condenser-equipped four-neck flask, where it was reacted at 150° C. for 2 hours. Cooling then yielded a silicone foam control composition having a viscosity of about 9,000 mm²/s. This silicone foam control composition was tested for its foam-inhibiting activity during washing and rinsing, and the results are reported in Table 1.

COMPARATIVE EXAMPLE 1

A coarse mixture was prepared from the following: 96 parts trimethylsiloxy-endblocked dimethylpolysiloxane having a viscosity of about 5,000 mm²/s, 4 parts dry-process silica having a specific surface area of 300 m²/g (Aerosil 300 from Nippon Aerosil Kabushiki Kaisha), and 0.03 parts sulfuric acid. This was followed by processing in a homomixer to obtain a thorough dispersion. This dispersion was transferred into a condenser-equipped four-neck flask, where it was reacted at 150° C. for 2 hours. Cooling then yielded a silicone foam control composition with a viscosity of 9,400 mm²/s. This silicone foam control composition was tested for its foam-inhibiting activity during washing and rinsing, and the results are reported in Table 1.

COMPARATIVE EXAMPLE 2

A coarse mixture was prepared from the following: 88 parts trimethylsiloxy-endblocked dimethylpolysiloxane having a viscosity of about 1,000 mm²/s, 10 parts wet-process silica having a specific surface area of 170 m²/g (FK 383 DS from the Degussa Corporation), and 2 parts (as effective component) of a solution of trimethylsiloxysilicate having the average formula $[(CH_3)_3SiO_{1/2}]_x[SiO_2]_y$, in which the ratio of x/y was about 0.75. This was followed by processing in a homomixer to obtain a thorough dispersion. This dispersion was transferred into a condenser-equipped four-neck flask. The temperature was raised to 180° C. and a reaction was run for 10 hours at 30 mmHg with degassing. Cooling and venting to ambient pressure yielded a silicone foam control composition with a viscosity of about 3,000 mm²/s. This silicone foam control composition was tested for its foam-inhibiting activity during washing and rinsing, and the results are reported in Table 1.

TABLE 1

Test Results for Foam Inhibition
During the Wash and Rinse Stages

|  | foam height during the wash stage | foam-inhibiting activity in the rinse stages | |
| --- | --- | --- | --- |
|  | (cm) | first | second |
| Example 1 | 9 | 4 | 6 |
| Example 2 | 6 | 4 | 6 |
| Example 3 | 2 | 4 | 6 |
| Example 4 | 5 | 3 | 5 |
| Comparative Example 1 | 1 | 4 | 5 |
| Comparative Example 2 | 1 | 4 | 6 |
| blank | 13 | 1 | 5 |

That which is claimed is:

1. A silicone foam control composition comprising:
   (A) 80 to 99 weight % of an organopolysiloxane represented by the average formula:

$R^1_a R^2_b Q_c SiO_{(4-a-b-c)/2}$ wherein $R^1$ is selected from the group consisting of hydrogen, a hydroxyl group, and a monovalent hydrocarbon group, optionally halogenated, having from 1 to 10 carbon atoms, $R^2$ denotes a monovalent hydrocarbon group having from 1 to 10 carbon atoms, Q denotes a group having the formula $-R^3Y$ wherein $R^3$ denotes a divalent hydrocarbon group having from 2 to 18 carbon atoms and Y is a carboxyl-functional monovalent organic group, a is zero or greater than zero, b and c are each positive numbers, with the proviso that the sum of a+b+c has a value of 1.9 to 2.2; and
   (B) 1 to 20 weight % of silica having a specific surface area of at least 50 m²/g.

2. A composition according to claim 1, wherein $R^1$ is selected from the group consisting of hydrogen, hydroxyl, methyl, ethyl, propyl, butyl, pentyl, hexyl, phenyl, tolyl, xylyl, benzyl, phenethyl, 3-chloropropyl, and 3,3,3-trifluoropropyl.

3. A composition according to claim 1, wherein $R^2$ is selected from the group consisting of methyl, ethyl, propyl, butyl, pentyl, hexyl, vinyl, and phenyl.

4. A composition according to claim 1, wherein $R^3$ is selected from the group consisting of ethylene, propylene, butylene, isobutylene, pentamethylene, octamethylene, decamethylene, dodecamethylene, and cyclohexylene.

5. A composition according to claim 1, wherein Y is selected from the group consisting of carboxyl, methylthiocarboxyl, and ethylthiocarboxyl.

6. A composition according to claim 1, wherein (A) is selected from the group consisting of

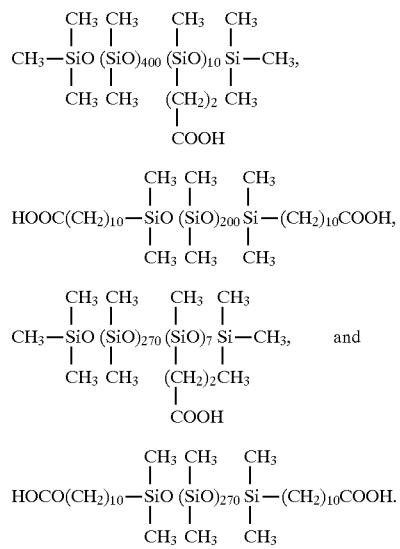

7. A composition according to claim 1, wherein (B) is selected from the group consisting of fumed silica, calcined silica, precipitated silica, silica aerogel, quartz, and fused silica.

8. A composition according to claim 1, wherein the composition further comprises a compound selected from the group consisting of organoalkoxysilanes, organosilazanes, organohalosilanes, and organosiloxane oligomers.

9. A composition according to claim 8, wherein said compound is selected from the group consisting of methyltrimethoxysilane, vinyltrimethoxysilane, trifluoropropyltrimethoxysilane, hexamethyldisilazane, trimethylchlorosilane, dimethylvinylchlorosilane, silanol-endblocked dimethylsiloxane oligomers, silanol-endblocked dimethylsiloxane-methylvinylsiloxane co-oligomers, dimethylhydrogensiloxy-endblocked dimethylsiloxane oligomers, trimethylsiloxy-endblocked methylhydrogensiloxane oligomers, and trimethylsiloxy-endblocked methylhydrogensiloxane-dimethylsiloxane co-oligomers.

10. A composition according to claim 1, wherein the composition further comprises at least one ingredient selected from the group consisting of
   (i) an organopolysiloxane selected from the group consisting of trimethylsiloxy-endblocked dimethylpolysiloxanes, dimethylvinylsiloxy-endblocked dimethylpolysiloxanes, trimethylsiloxy-endblocked methylhydrogenpolysiloxanes, trimethylsiloxy-endblocked methylhydrogensiloxane-dimethylsiloxane copolymers, dimethylhydroxysiloxy-endblocked dimethylpolysiloxanes, dimethylhydrogensiloxy-endblocked dimethylpolysiloxanes, dimethylsiloxane-methyl (polyoxyalkylene)siloxane copolymers,
   (ii) silicone resins, and
   (iii) inorganic powders selected from aluminum hydroxide or calcium carbonate.

11. A composition according to claim 10, wherein the silicone resin is a triorganosiloxysilicate having the formula

$[(CH_3)_3SiO_{1/2}]_x[SiO_2]_y$ wherein the ratio of x/y ranges from 0.125 to 6.

12. A composition according to claim 1, wherein the composition further comprises a water soluble or water dispersible carrier.

13. A composition according to claim 12, wherein the carrier is selected from the group consisting of polyethylene glycol, polyethylene glycol-polypropylene glycol copolymers, alkyl ethers of polyethylene glycol, higher alcohols, higher fatty acid esters, methylcellulose, hydroxymethylcellulose, hydroxycellulose, carboxyvinylcellulose, sucrose fatty acid esters, polyvinyl alcohol, starch, gelatin, and agar.

14. A method of making a silicone foam control composition comprising the step of:
   (I) heating at a temperature of 30° C. to 200° C. a mixture comprising:
   (A) 80 to 99 weight % of an organopolysiloxane represented by the average formula:

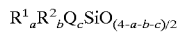
$R^1_a R^2_b Q_c SiO_{(4-a-b-c)/2}$ wherein $R^1$ is selected from the group consisting of hydrogen, a hydroxyl group, and a monovalent hydrocarbon group having from 1 to 10 carbon atoms, $R^2$ denotes a monovalent hydrocarbon group having from 1 to 10 carbon atoms, Q denotes a group having the formula $-R^3Y$ wherein $R^3$ denotes a divalent hydrocarbon group having from 2 to 18 carbon atoms and Y is a carboxyl-functional monovalent organic group, a is zero or greater than zero, b and c are each positive numbers, with the proviso that the sum of a+b+c has a value of 1.9 to 2.2; and
   (B) 1 to 20 weight % of silica having a specific surface area of at least 50 m²/g.

15. A method according to claim 14, wherein the mixture of (I) further comprises a catalyst.

16. A method according to claim 15, wherein the catalyst is selected from sulfuric acid or potassium hydroxide.

17. A method according to claim 14, wherein the mixture of (I) further comprises a compound selected from the group consisting of organoalkoxysilanes, organosilazanes, organohalosilanes, and organosiloxane oligomers.

18. A method according to claim 17, wherein said compound is selected from the group consisting of methyltrimethoxysilane, vinyltrimethoxysilane, trifluoropropyltrimethoxysilane, hexamethyldisilazane, trimethylchlorosilane, dimethylvinylchlorosilane silanol-endblocked dimethylsiloxane oligomers, silanol-endblocked dimethylsiloxane-methylvinylsiloxane co-oligomers, dimethylhydrogensiloxy-endblocked dimethylsiloxane oligomers, trimethylsiloxy-endblocked methylhydrogensiloxane oligomers, and trimethylsiloxy-endblocked methylhydrogensiloxane-dimethylsiloxane co-oligomers.

19. A composition produced in accordance with the method of claim 14.

20. A composition produced in accordance with the method of claim 15.

21. A composition produced in accordance with the method of claim 17.

22. In a process of controlling foam, which includes the addition of a foam control composition to a detergent composition, the improvement comprising using as the foam control composition, the composition of claim 1.

23. In a process of controlling foam, which includes the addition of a foam control composition to a detergent composition, the improvement comprising using as the foam control composition, the composition of claim 19.

24. In a process of controlling foam, which includes the addition of a foam control composition to a detergent composition, the improvement comprising using as the foam control composition, the composition of claim 20.

25. In a process of controlling foam, which includes the addition of a foam control composition to a detergent composition, the improvement comprising using as the foam control composition, the composition of claim 21.

* * * * *